United States Patent
Kulha

(10) Patent No.: US 7,205,885 B2
(45) Date of Patent: Apr. 17, 2007

(54) TIRE SENSOR COMMUNICATION SYSTEM

(75) Inventor: Steven P. Kulha, Shelby Township, MI (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 141 days.

(21) Appl. No.: 10/853,542

(22) Filed: May 25, 2004

(65) Prior Publication Data

US 2005/0046559 A1  Mar. 3, 2005

Related U.S. Application Data

(60) Provisional application No. 60/497,571, filed on Aug. 25, 2003.

(51) Int. Cl.
- B60C 23/00 (2006.01)
- B60C 23/02 (2006.01)
- E01C 23/00 (2006.01)
- G01M 17/02 (2006.01)

(52) U.S. Cl. ............... 340/442; 340/443; 340/444; 340/445; 340/446; 340/447; 73/146; 73/146.2; 73/146.3; 73/146.4; 73/146.5

(58) Field of Classification Search ........ 340/442–448; 73/146, 146.2, 146.3, 146.4, 146.5, 146.1
See application file for complete search history.

(56) References Cited

U.S. PATENT DOCUMENTS

| | | | |
|---|---|---|---|
| 3,852,717 A | * | 12/1974 | Hosaka et al. ............. 340/448 |
| 3,881,170 A | * | 4/1975 | Hosaka et al. ............. 340/448 |
| 4,514,645 A | * | 4/1985 | Endo et al. ................ 307/10.1 |
| 5,033,295 A | * | 7/1991 | Schmid et al. ............ 73/146.5 |
| 5,193,387 A | * | 3/1993 | Hodate ...................... 73/146.5 |
| 5,228,337 A | * | 7/1993 | Sharpe et al. ............. 73/146.5 |
| 5,883,305 A | | 3/1999 | Jo et al. |
| 5,963,128 A | | 10/1999 | McClelland |
| 6,043,738 A | | 3/2000 | Stewart et al. |
| 6,408,690 B1 | | 6/2002 | Young et al. |
| 6,486,776 B1 | | 11/2002 | Pollack et al. |
| 6,507,276 B1 | | 1/2003 | Young et al. |
| 6,535,116 B1 | | 3/2003 | Zhou |

FOREIGN PATENT DOCUMENTS

| | | |
|---|---|---|
| DE | 41 25 695 A | 2/1992 |
| GB | 2 382 205 A | 5/2003 |
| WO | WO 02/42095 A | 5/2002 |
| WO | WO 03/031210 A | 4/2003 |

OTHER PUBLICATIONS

PCT International Search Report, dated Nov. 23, 2004.

* cited by examiner

Primary Examiner—Daniel Wu
Assistant Examiner—Lam Pham

(57) ABSTRACT

A wheel sensor communication system (10) includes a primary coil (30) and a secondary coil (32), which operate as an electromagnetic transformer which is uncoupled mechanically but coupled electrically through a vehicle wheel assembly rotational interface. The electromagnetic transformer provides for the transfer of energy and data from a sensor (18) to a controller (14).

17 Claims, 1 Drawing Sheet

TIRE SENSOR COMMUNICATION SYSTEM

REFERENCE TO RELATED APPLICATIONS

The present application claims priority to U.S. Provisional Patent Application Ser. No. 60/497,571, filed Aug. 25, 2003.

BACKGROUND OF THE INVENTION

The present invention relates to a vehicle sensor system, and more particularly to a communication system that operates through a rotary interface within a wheel hub assembly.

Vehicles often include a sensor system, which measures the pressure of each tire and provides continuous monitoring of the pressure to a driver of the vehicle. Recently, these systems may become mandatory in the industry.

Such a system generally includes a controller mounted within the vehicle and remote circuitry located in each tire for detecting the tire pressure and transmitting the detected tire pressure to the controller. The controller receives the detected tire pressure and presents it to the driver.

As will be appreciated, providing power for, and communicating with, the remote circuitry in each tire of the vehicle may be relatively difficult. Typically, the systems are limited to certain frequency bands and to specific power levels. National and international regulations that govern these devices require testing and certification to a certain standard. Given that the standard is low in RF output power, the system may have difficulty in meeting certain functional requirements. To meet certain requirements, each specific application is measured and tuned to multiple parameters. One difficult parameter is the difference in the quantity of steel in the tire and tire-to-tire variation. Another difficult parameter is the position and rotation of the tire/wheel speed in normal driving situations in which the RF carrier may be unintentionally modulated.

Another difficulty is the necessity to provide significant battery life to ensure the electronics will operate without replacement. Conventional systems often utilize coin cell batteries that expire or wear down from extended use and temperature.

Yet another difficulty is that the system must be robust. The current systems are often integrated into the valve stem assembly. Upon a tire change, care must be taken not to damage the seal or electronics. Due to the exposed valve stem position, conventional systems may receive external shock that could permanently damage or destroy functionality. In addition, care must be taken with balancing the tire as the stem mounted sensor has mass which must be offset.

Accordingly, it is desirable to provide an inexpensive and robust communication system for a tire mounted sensor system which operates through the rotational interface with minimal interference.

SUMMARY OF THE INVENTION

The wheel sensor communication system according to the present invention provides for communication through a rotational interface such as a vehicle wheel hub assembly. The communication system includes a controller, a power source and a sensor mounted within each tire of a wheel assembly. Each wheel assembly includes a primary and a secondary coil, which operate as a transformer that is uncoupled mechanically but coupled electrically. The electromagnetic transformer provides for the transfer of energy and data to provide functionality.

The primary coil and the secondary coil also provide for anti-theft features as the transformer will no longer be complete if the secondary coil is removed from the primary coil such that the controller will identify the loss through induction. An alarm is then activated which indicates wheel loss.

The present invention therefore provides an inexpensive and robust communication system for a tire mounted sensor system that operates through the rotational interface with minimal interference.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
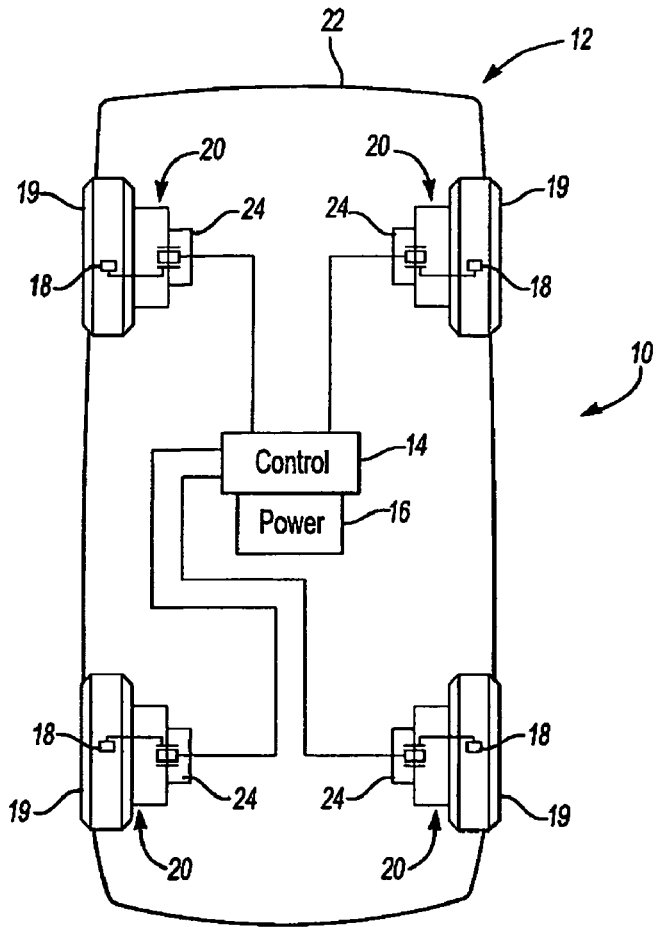
FIG. 1 is a general schematic view of a vehicle with a tire sensor communication system.

FIG. 1 illustrates a general schematic view of a wheel sensor communication system 10 mounted within a vehicle 12. The communication system includes a controller 14, a power source 16 and a sensor 18 mounted within each wheel 19. It should be understood that loads of various types and functions including but not limited to pressure, temperature and acceleration will benefit from the present invention.

A rotational interface 20 such as a hub assembly or the like is located between the vehicle body 22 and each wheel 19. The controller 14 communicates with the sensor 18 mounted within each vehicle wheel 19 through an electromagnetic transformer 24 located within the rotational interface 20 that is uncoupled mechanically but coupled electrically.

Figure 2:
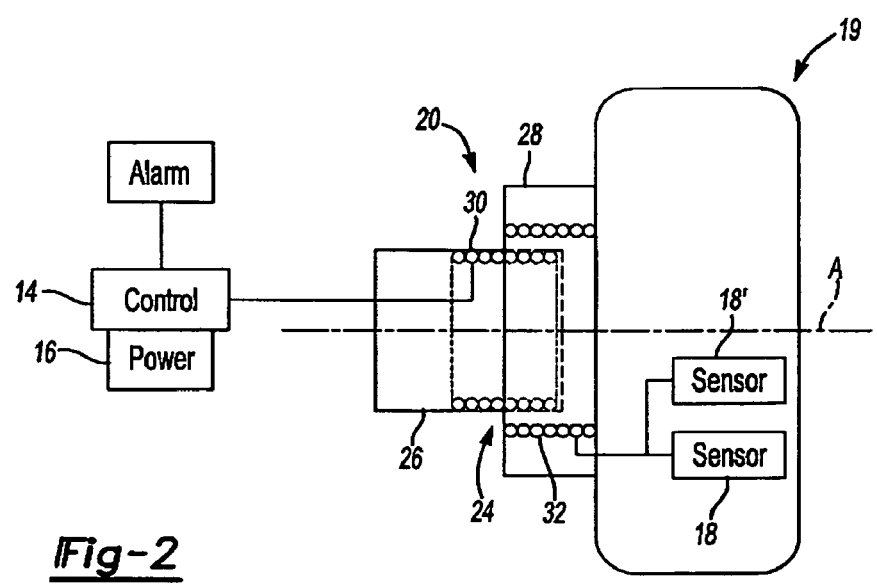
FIG. 2 is a block diagram of a rotational interface with a tire sensor communication system.

Referring to FIG. 2, the rotational interface 20 includes a hub shaft 26 which defines an axis A. Although only a single rotational interface will be described it should be understood that each rotational interface is generally comparable. The hub shaft 26 rotationally mounts the wheel 19 for rotation about the axis A through a corresponding wheel hub 28. The wheel hub 28 generally telescopes over the hub shaft 26 for relative rotation therewith. It should be understood that although a particular rotational interface is disclosed schematically in the illustrated embodiment, other rotational interfaces will likewise benefit from the present invention.

The transformer 24 generally includes a primary coil 30 mounted to the hub shaft 26 and a secondary coil 32 mounted to the wheel hub 28. The shaft 26 and/or the wheel hub 28 may operate as the core of the transformer 24. The primary coil 30 receives power from the power source 16 and is in communication with the controller 14. Preferably, the primary coil 30 and the secondary coil 32 are at least partially concentric about axis A to provide an electromagnetic link therebetween. That is, the primary coil 30 is at least partially telescoped within the secondary coil 32. Current flows through the primary coil 30, and the resulting magnetic flux induces current through the magnetic field and across the secondary coil 32, completing the circuit. Alternatively, the primary coil 30 and the secondary coil 32 are axially displaced along axis A but provide a partial overlap.

The secondary coil 32 is in communication with the sensor 18. It should be understood that a multiple of sensors 18' may additionally be in communication with the secondary coil 32 which is electromagnetically coupled with the primary coil 30. The electromagnetic coupling enables both data and energy to be transferred for the purpose of supplying power and a data link. This data link provides for messaging and transfers information to controller 14. For energy transfer, the hub is the primary and the wheel is the secondary. For data transfer, it is bi-directional. The data bits can come from the primary and received by the secondary or vise versa. The energy that is coupled provides a source of power through the rotational interface 20 so that any electronic system and/or sensors can be operated without a power source located within the wheel 19

As the primary coil 30 is mounted about the hub shaft 26 and the secondary coil 32 is mounted within the wheel hub 28, the system 10 is minimally affected by tire or wheel replacement. That is, re-synchronization is generally automatic as the hub shaft 26 and the wheel hub 28 interface is essentially repeatable.

The primary coil 30 and the secondary coil 32 provide for anti-theft features. As the primary coil 30 is powered, removal of the secondary coil 32 is readily detected by the controller 14 in communication with the primary coil 30. That is, the transformer will no longer be complete when the secondary coil 32 is removed from the primary coil 30 such that the controller will identify the loss through induction. An alarm or the like may then be activated.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A communication system for a wheel assembly comprising:
   a wheel hub rotationally mounted to a hub shaft;
   a controller;
   a power source;
   a rotationally fixed primary coil mounted to said hub shaft about an axis, said primary coil powered by said power source and in communication with said controller;
   a secondary coil mounted for rotation about said axis, said secondary coil mounted to said wheel hub along the axis, said secondary coil and said primary coil mounted in an at least partially telescoped relationship; and
   a sensor in communication with said secondary coil.

2. The communication system as recited in claim 1, wherein said sensor comprises a pressure sensor mounted within a tire.

3. The communication system as recited in claim 1, wherein said sensor comprises a temperature sensor mounted within a tire.

4. The communication system as recited in claim 1, wherein said primary coil is telescoped within said secondary coil.

5. The communication system as recited in claim 1, wherein said primary coil and said secondary coil provides an electromagnetic coupling that enables both data and power transference.

6. The communication system as recited in claim 5, wherein said electromagnetic coupling communicates information to said controller.

7. The communication system as recited in claim 5, wherein said electromagnetic coupling communicates energy from said primary coil to said secondary coil.

8. The communication system as recited in claim 1, wherein said power source is in electrical communication with said primary coil, said primary coil rotationally stationary.

9. The communication system as recited in claim 1, wherein an electromagnetic coupling between said primary coil and said secondary coil transfers both data and energy therebetween.

10. The communication system as recited in claim 9, wherein said data is bi-directional.

11. The communication system as recited in claim 9, wherein power is provided from said primary coil to said secondary coil.

12. A method of communicating through a rotational interface comprising the steps of:
    (1) electrically coupling a rotationally fixed primary coil about an axis with a secondary coil mounted for rotation about the axis, the secondary coil and the primary coil mounted in an at least partially telescoped relationship;
    (2) powering the primary coil;
    (3) connecting a sensor to the secondary coil;
    (4) communicating data from the sensor to a controller through the electrical coupling; and
    (5) triggering an alarm in response to a decoupling of the electrical coupling of said step (1).

13. A method as recited in claim 12, wherein said step (1) further comprises mounting the rotationally fixed primary coil to a hub shaft.

14. A method as recited in claim 13, wherein said step (1) further comprises mounting the secondary coil to a wheel hub mounted over the hub shaft.

15. A method as recited in claim 12, wherein said step (4) further comprises communicating a tire pressure.

16. A method as recited in claim 12, wherein said step (4) further comprises communicating a tire temperature.

17. A method as recited in claim 12, wherein said step (1) further comprises mounting the rotationally primary coil and the secondary coil to a wheel assembly.

* * * * *